(12) United States Patent
Hoek et al.

(10) Patent No.: US 10,774,277 B2
(45) Date of Patent: Sep. 15, 2020

(54) PROCESS TO PREPARE PARAFFIN WAX

(71) Applicant: SHELL OIL COMPANY, Houston, TX (US)

(72) Inventors: Arend Hoek, Amsterdam (NL); Antonius Adrianus Maria Roovers, Pulua Bukom (SG); Kaushik Majumder, Bangalore Karnataka (IN); Hélène Toledano, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 99 days.

(21) Appl. No.: 15/540,270

(22) PCT Filed: Dec. 29, 2015

(86) PCT No.: PCT/EP2015/081335
§ 371 (c)(1),
(2) Date: Jun. 28, 2017

(87) PCT Pub. No.: WO2016/107864
PCT Pub. Date: Jul. 7, 2016

(65) Prior Publication Data
US 2017/0369799 A1 Dec. 28, 2017

(30) Foreign Application Priority Data
Dec. 31, 2014 (EP) .................................. 14200717

(51) Int. Cl.
*C10G 73/44* (2006.01)
*C10G 65/04* (2006.01)
(Continued)

(52) U.S. Cl.
CPC .............. *C10G 73/44* (2013.01); *C08L 91/08* (2013.01); *C10G 2/32* (2013.01); *C10G 45/02* (2013.01);
(Continued)

(58) Field of Classification Search
CPC .......... C10G 2/32; C10G 45/02; C10G 65/04; C10G 73/36; C10G 73/44; C08L 91/08
See application file for complete search history.

(56) References Cited

U.S. PATENT DOCUMENTS

| 2,692,835 | A | 10/1954 | Capell et al. |
| 6,858,127 | B2 | 2/2005 | Hoek et al. |

(Continued)

FOREIGN PATENT DOCUMENTS

| DE | 102010044319 A1 | 3/2012 |
| EP | 0579330 A1 | 1/1994 |

(Continued)

OTHER PUBLICATIONS

International Search Report and Written Opinion received for PCT Patent Application No. PCT/EP2015/081335, dated Mar. 30, 2016, 13 pages.

(Continued)

*Primary Examiner* — Brian A McCaig

(57) ABSTRACT

A process to prepare paraffins and waxes is provided, the process comprising:
subjecting a Fischer-Tropsch product stream comprising paraffins having from 10 to 300 carbon atoms to a hydrogenation step, thereby obtaining a hydrogenated Fischer-Tropsch product stream comprising 10 to 300 carbon atoms;
separating the hydrogenated Fischer-Tropsch product stream, thereby obtaining at least a fraction comprising 10 to 17 carbon atoms and a fraction comprising 18 to 300 carbon atoms;
separating the fraction comprising 18 to 300 carbon atoms, thereby obtaining one or more first light waxes having a congealing point in the range of 30 to 75° C. and a second heavy wax having a congealing point in the range of 75 to 120° C.; and (Continued)

hydrofinishing one or more wax fractions having a congealing point in the range of 30 to 75° C. thereby obtaining one or more hydrofinished wax fractions having a congealing point in the range of 30 to 75° C.

18 Claims, 1 Drawing Sheet

(51) Int. Cl.
*C10G 73/36* (2006.01)
*C08L 91/08* (2006.01)
*C10G 45/02* (2006.01)
*C10G 2/00* (2006.01)

(52) U.S. Cl.
CPC ............. *C10G 65/04* (2013.01); *C10G 73/36* (2013.01); *C10G 2300/1022* (2013.01); *C10G 2300/30* (2013.01)

(56) References Cited

U.S. PATENT DOCUMENTS

| | | | |
|---|---|---|---|
| 2010/0189674 A1* | 7/2010 | Morrison | A61K 8/31 424/70.1 |
| 2013/0209709 A1 | 8/2013 | Schneider et al. | |
| 2015/0166909 A1* | 6/2015 | Loudon | B01D 9/0013 208/27 |

FOREIGN PATENT DOCUMENTS

| | | |
|---|---|---|
| EP | 1498469 A2 | 1/2005 |
| WO | 9612778 A1 | 5/1996 |
| WO | 0011113 A1 | 3/2000 |
| WO | 02102941 A2 | 12/2002 |
| WO | 03070857 A1 | 8/2003 |
| WO | 2004009739 A2 | 1/2004 |
| WO | 2007082589 A1 | 7/2007 |
| WO | 2013064539 A1 | 5/2013 |
| ZA | 9900253 B | 7/2000 |

OTHER PUBLICATIONS

Anonymous, "Sasolwax—Rubber & Tyre", Retrieved from the Internet: URL:http://www.sasolwax.com/en/Applications/Industrial+Waxes/Rubber+_+Tyre.html, Sasolwax, 2 pages, Dec. 22, 2009, XP055202035.

Anonymous, "Sasolwax—Chemistry & Blending", Retrieved from the Internet: URL:http://www.sasolwax.com/en/Applications/Industrial+Waxes/Chemistry+_+Blending.html, Sasolwax, 2 pages, Oct. 22, 2009, XP055202036.

Anonymous, "Sasolwax—Construction & Insulation", Retrieved from the Internet: URL:http://www.sasolwax.com/en/Applications/Industrial+Waxes/Construction+_+Insulation.html, Sasolwax, 2 pages, Oct. 22, 2009, XP055202037.

Anonymous, "Sasolwax—Paper & Packaging", Retrieved from the Internet: URL:http://www.sasolwax.com/en/Applications/Industrial+Waxes/Paper+_+Packaging.html, Sasolwax, 2 pages, Oct. 22, 2009, XP055202038.

Rase, "Handbook of Commercial Catalysts: Heterogeneous Catalysts", CRC Press LLC, Florida, Mar. 24, 2000, ISBN 0-8493-9417-1, 3 pages.

Gorak et al., "Vacuum and High-Pressure Distillation", Distillation: Operations and Applications, Elsevier Inc, 1st Edition, Chapter 9.1, Oxford, Jul. 18, 2014.

Scherzer et al., "Reactions and Reaction Pathways", Hydrocracking Science and Technology, Chapter 6, 1996, ISBN 0-8247-9760-4.

\* cited by examiner

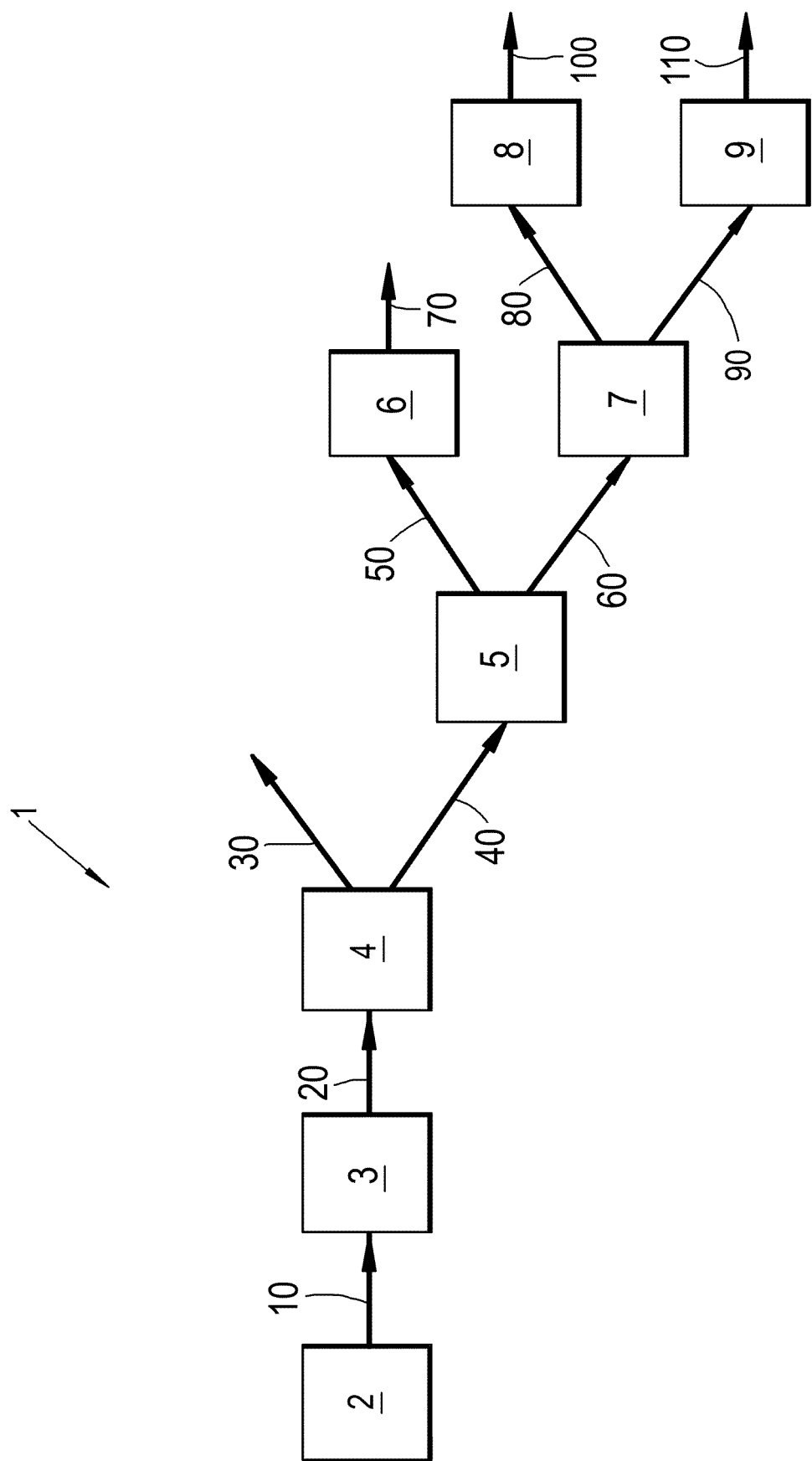

PROCESS TO PREPARE PARAFFIN WAX

PRIORITY CLAIM

The present application is the National Stage (§ 371) of International Application No. PCT/EP2015/081335, filed Dec. 29, 2015, which claims priority from European Patent Application No. 14200717.8, filed Dec. 31, 2014 incorporated herein by reference.

The present invention provides a process to prepare paraffins and waxes.

Paraffin wax may be obtained by various processes. U.S. Pat. No. 2,692,835 discloses a method for deriving paraffin wax from crude oil. Also, paraffin wax may be obtained using the so called Fischer-Tropsch process. An example of such process is disclosed in WO 2002/102941, EP 1 498 469, WO 2004/009739 and WO 2013/064539.

WO 2000/11113 discloses a process to prepare Fischer-Tropsch derived wax products, by feeding a Fischer-Tropsch derived paraffinic into a distillation column, followed by operating the distillation column to produce wax products, which wax products are withdrawn from the distillation column.

A problem of the process disclosed in WO 2000/11113 is that although this process delivers wax products, wax products with a congealing point of above 100° C. are not produced. Moreover, with the process disclosed in WO 2000/11113 wax products with a low Saybolt colour are obtained. This is caused by distilling the Fischer-Tropsch derived feed without a preceding hydrogenation step, which step affects the Saybolt colour of the obtained Fischer-Tropsch derived waxes in a positive way.

The relation between hydrogenation of the Fischer-Tropsch derived feed and the Saybolt colour of Fischer-Tropsch derived waxes is for example described on page 181 in the "Handbook of Commercial Catalysts, Heterogeneous catalysts", Howard F. Rase, CRC Press LLC, Florida, 2000, ISBN 0-8493-9417-1.

It is an object of the invention to solve or minimize at least of one of the above problems.

It is a further object of the invention to provide a method for preparing wax products with a high congealing point, low oil content and also high Saybolt colours.

It is a further object of the present invention to provide an efficient method for preparing wax products having different congealing points.

One of the above or other objects may be achieved according to the present invention by providing a process to prepare paraffins and waxes, the process at least comprising the following steps:
(a) providing a Fischer-Tropsch product stream comprising paraffins having from 10 to 300 carbon atoms;
(b) subjecting the Fischer-Tropsch product stream of step (a) to a hydrogenation step, thereby obtaining a hydrogenated Fischer-Tropsch product stream comprising 10 to 300 carbon atoms;
(c) separating the hydrogenated Fischer-Tropsch product stream of step (b), thereby obtaining at least a fraction comprising 10 to 17 carbon atoms and a fraction comprising 18 to 300 carbon atoms;
(d) separating the hydrogenated fraction comprising 18 to 300 carbon atoms of step (c), thereby obtaining one or more first light waxes having a congealing point in the range of 30 to 75° C. and a second heavy wax having a congealing point in the range of 75 to 120° C.;
(e) hydrofinishing one or more wax fractions having a congealing point in the range of 30 to 75° C. of step (d) thereby obtaining one or more hydrofinished wax fractions having a congealing point in the range of 30 to 75° C.

It has now surprisingly been found according to the present invention that several wax products having different congealing points and high Saybolt colours can be prepared in a surprisingly simple and elegant manner requiring a low number of distillations.

An important advantage of the present invention is that wax products with high congealing points are obtained having high Saybolt colours.

A further advantage is that the hydrogenated Fischer-Tropsch product stream is more stable with respect to product degradation in subsequent distillation steps. Degradation may be caused by exposure to high temperature and by oxygen ingress in vacuum columns. Hydrogenation generally results in higher quality of the normal paraffinic products, e.g. in terms of colour or odour.

Another advantage is that the process line-up comprises a single stream containing both the fraction comprising 10 to 17 carbon atoms as well as the fraction comprising 18 to 300 carbon atoms which are processed in a single hydrogenation unit. Only a single hydrogenation unit is required which presents an advantage in installed costs as well as in operational costs compared to when separate hydrogenation units are employed for the fraction comprising 10 to 17 carbon atoms and the fraction comprising 18 to 300 carbon atoms.

In step (a) of the process according to the present invention a Fischer-Tropsch product stream comprising paraffins having from 10 to 300 carbon atoms is provided.

By the part "a Fischer-Tropsch product stream comprising paraffins having from 10 to 300 carbon atoms" is meant 10 to 300 carbon atoms per molecule.

The Fischer-Tropsch product stream as provided in step (a) is derived from a Fischer-Tropsch process. Fischer-Tropsch product stream is known in the art. By the term "Fischer-Tropsch product" is meant a synthesis product of a Fischer-Tropsch process. In a Fischer-Tropsch process synthesis gas is converted to a synthesis product. Synthesis gas or syngas is a mixture of hydrogen and carbon monoxide that is obtained by conversion of a hydrocarbonaceous feedstock. Suitable feedstock include natural gas, crude oil, heavy oil fractions, coal, biomass and lignite. A Fischer-Tropsch product derived from a hydrocarbonaceaous feedstock which is normally in the gas phase may also be referred to a GTL (Gas-to-Liquids) product. The preparation of a Fischer-Tropsch product has been described in e.g. WO2003/070857.

The product stream of the Fischer-Tropsch process is usually separated into a water stream, a gaseous stream comprising unconverted synthesis gas, carbon dioxide, inert gasses and C1 to C3, and a C4+ stream.

The full Fischer-Tropsch hydrocarbonaceous product suitably comprises a C1 to C300 fraction.

Lighter fractions of the Fischer-Tropsch product, which suitably comprises C3 to C9 fraction are separated from the Fischer-Tropsch product by distillation thereby obtaining a Fischer-Tropsch product stream, which suitably comprises C10 to C300 fraction.

The weight ratio of compounds having at least 60 or more carbon atoms and compounds having at least 30 carbon atoms in the Fischer-Tropsch product is preferably at least 0.2, more preferably 0.3.

Suitably, in case of preparation of Fischer-Tropsch derived wax fraction having a congealing point of above 90° C. weight ratio is at least 0.5.

The weight ratio in the Fischer-Tropsch product may lead to Fischer-Tropsch derived paraffin waxes having a low oil content.

In step (b) of the process according to the present invention the Fischer-Tropsch product stream of step (a) is subjected to a hydrogenation step to obtain a hydrogenated Fischer-Tropsch product stream comprising 10 to 300 carbon atoms.

The hydrogenation is suitably carried out at a temperature between 200 and 275° C. and at a pressure between 20 and 70 bar. Typically, hydrogenation removes olefins and oxygenates from the fractions being hydrogenated.

In step (c) of the process according to the present invention the hydrogenated Fischer-Tropsch product stream of step (b) is separated to obtain at least a fraction comprising 10 to 17 carbon atoms and a fraction comprising 18 to 300 carbon atoms.

Suitably, the hydrogenated paraffins comprising 10 to 17 carbon atoms are hydrogenated normal paraffins. Typical hydrogenation conditions for hydrogenation of the above are for example described in e.g. WO2007/082589.

The separation is preferably performed by means of a distillation at atmospheric or slightly below atmospheric pressure conditions. It is preferred that the distillation is carried out at a pressure of 500 mbara to atmospheric and a temperature of 250 to 330° C. in the bottom section of the column.

In step (d) of the process according to the present invention the hydrogenated fraction comprising 18 to 300 carbon atoms of step (c) is separated to obtain one or more first light waxes having a congealing point in the range of 30 to 75° C. and a second heavy wax having a congealing point in the range of 75 to 120° C.

By light wax is meant wax having a congealing point in the range of from 30 to 75° C. By heavy wax is meant wax having a congealing point in the range of from 75 to 120° C.

Suitably, the hydrogenated fraction comprising 18 to 300 carbon atoms of step (b) is separated by vacuum distillation at a pressure between 5 and 20 mbar, preferably between 5 and 15 mbar, and more preferably between 10 and 15 mbar. Also the distillation is preferably carried out at a temperature of from 300 to 350° C.

Preferably, the first light one or more waxes are obtained as distillate and/or side cuts in vacuum distillation.

Suitably, the first light one or more waxes, as obtained as distillate and/or side cuts in vacuum distillation, are a first light wax fraction having a congealing point in the range of from 30 to 35° C., a second light wax fraction having a congealing point in the range of from 50 to 60° C., and a third light wax fraction having a congealing point in the range of 65 to 75° C.

Suitably, the first light wax fraction is obtained as top cut of the vacuum distillation, the second light wax fraction is obtained as a side cut of the vacuum distillation and the third light wax fraction is obtained as heavier side cut of the vacuum distillation.

In step (e) of the process according to the present invention one or more light wax fractions having a congealing point in the range of from 30 to 75° C. of step (d) are hydrofinished thereby obtaining one or more hydrofinished wax fractions having a congealing point in the range of from 30 to 75° C. Suitably, a wax fraction having a congealing point in the range 30 to 75° C. is hydrofinished thereby obtaining a hydrofinished wax fraction having a congealing point in the range of from 30 to 75° C.

The congealing point of the waxes according to the present invention are determined by ASTM D938.

Optionally, the first and second light wax fractions are hydrofinished thereby obtaining a first light hydrofinished wax fraction having a congealing point in the range of from 30 to 35° C., and a second light hydrofinished wax fraction having a congealing point in the range of from 50 to 60° C.

Preferably at least the third light wax i.e. the heaviest side cut of the vacuum distillation step is hydrofinished thereby obtaining a hydrofinished wax fraction having a congealing point in the range of 65-75° C.

Typical hydrofinishing conditions for hydrofinishing of the above are for example described in e.g. WO2007/082589.

Suitably, the second heavy wax of step (d) is separated, thereby obtaining at least one distillate wax fraction having a congealing point in the range of from 75 to 85° C. and at least one residual wax fraction having a congealing point from 95 to 120° C.

Preferably, the heavy second wax of step (d) is separated, thereby obtaining at least one distillate wax fraction having a congealing point in the range of from 70 to 90° C., preferably 70 to 85° C. and more preferably 75 to 85° C.

Suitably, the heavy distillate wax fraction having a congealing point in the range of from 75 to 85° C. is hydrofinished thereby obtaining a hydrofinished heavy distillate wax fraction having a congealing point in the range of from 75 to 85° C.

Further, the heavy distillate wax fraction having a congealing point in the range of from 70 to 90° C., preferably in the range of from 70 to 85° C. and more preferably in the range of from 75 to 85° C. are hydrofinished thereby obtaining hydrofinished heavy distillate wax fraction having a congealing point in the range of from 70 to 90° C., preferably in the range of from 70 to 85° C. and more preferably in the range of from 75 to 85° C.

Preferably, the heavy residual wax fraction having a congealing point in the range of from 95 to 120° C. is hydrofinished thereby obtaining a hydrofinished heavy residual wax fraction having a congealing point in the range of from 95 to 120° C.

Typical hydrofinishing conditions for hydrofinishing of the above are for example described in e.g. WO2007/082589.

The heavy second wax is preferably separated by short path distillation at a pressure between 0.1 and 1 mbar, preferably between 0.05 and 0.5 mbar, and more preferably between 0.05 and 0.3 mbar. The distillation is preferably carried out at a temperature of from 200 to 350° C. and more preferably from 250 to 300° C.

Typically, the residual heavy wax having a congealing point in the range of from 95 to 120° C. is obtained as the residual fraction of the short path distillation. By the term residual is meant a fraction obtained with distillation which is a residual bottom fraction and is neither a top cut nor a side cut.

Short path distillation, also known as molecular distillation is known in the art and therefore not described here in detail. An example of a form of short path distillation is a Wiped Film Evaporator. Typical short path distillations are for example described in Chapter 9.1 in "Distillation, operations and applications", Andrzej Górak and Hartmut Schoenmakers, Elsevier Inc, Oxford, 2014.

Thus, preferably the heavy residual wax fraction having a congealing point in the range of from 95 to 120° C. is hydrofinished thereby obtaining a hydrofinished heavy residual wax fraction having a congealing point in the range of from 95 to 120° C.

In a different embodiment according to the present invention, a part of the heavy second wax of step (d) is subjected to a hydrocracking/hydroisomerisation step step to obtain a partly isomerised product.

It has been found that the amount of the isomerised product is dependent on the hydrocracking/hydroisomerization conditions.

Hydrocracking/hydroisomerization processes are known in the art and therefore not discussed here in detail.

Hydrocracking/hydroisomerization and the effect of hydrocracking/hydroisomerization conditions on the amount of isomerised product are for example described in Chapter 6 of "Hydrocracking Science and Technology", Julius Scherzer; A. J. Cruia, Marcel Dekker, Inc, New York, 1996, ISBN 0-8247-9760-4.

In a further aspect the present invention provides a Fischer-Tropsch derived wax obtainable by the process according to the present invention. Preferably, one or more Fischer-Tropsch derived waxes having a congealing point in a range of from 30 to 120° C. are obtained. More preferably, a Fischer-Tropsch derived wax having a congealing point in the range of from 30 to 35° C. or in the range of from 50 to 60° C. or in the range of from 60 to 70° C., or in the range of from 75 to 85° C. or in the range of from 95 to 100° C., or in the range of from 100 to 106° C. or in the range of from 106 to 120° C. is obtained by the process according to the present invention.

Preferably, the Fischer-Tropsch derived waxes have a Saybolt colour according to ASTM D156 more than 25 cm, preferably more than 28 cm, more preferably more than 30 cm.

Typically, the Saybolt colour scale is used to quantify colour intensity for mildly coloured substances in liquid state. For this objective waxes are molten for measurement. The scale runs from <−16 cm to >30 cm. >30 cm means water white. The higher the number the better (i.e. the lesser) the colour.

The paraffin wax according to the present invention has preferably an oil content according to ASTM D721 of less than 0.5 wt. %, more preferably less than 0.45 wt. %.

FIG. 1 schematically shows a process scheme of the process scheme of a preferred embodiment of the process according to the present invention.

For the purpose of this description, a single reference number will be assigned to a line as well as a stream carried in that line.

The process scheme is generally referred to with reference numeral 1.

In a Fischer-Tropsch process reactor 2 a Fischer-Tropsch product stream 10 is obtained. Product stream 10 is fed to a hydrogenation reactor 3 wherein fraction 10 is converted to a hydrogenated fraction 20.

Fraction 20 is separated in a distillation column 4 into a fraction 30 comprising 10 to 17 carbon atoms and a fraction 40 comprising 18 to 300 carbon atoms.

Fraction 40 is distilled in a vacuum distillation column 5 to recover one or more wax fractions 50 having a congealing point in the range of from 30 to 75° C. and a heavy fraction 60. Fractions 50 is fed to a hydrofinishing reactor 6 wherein fractions 50 is converted to hydrofinished fractions 70 having a congealing point in the range of from 30 to 75° C.

Heavy wax 60 is distilled in a short path distillation column 7 to recover a first heavy wax fraction 80 having a congealing point in the range of from 75 to 85° C. and a second heavy wax fraction 90 having a congealing point in the range of from 95 to 120° C.

Fraction 80 is fed to a hydrofinishing reactor 8 wherein fraction 80 is converted to a hydrofinished fraction 100 having a congealing point in the range of from 75 to 85° C.

Fraction 90 is fed to a hydrofinishing reactor 9 wherein fraction 90 is converted to a hydrofinished fraction 110 having a congealing point in the range of from 95 to 120° C.

The present invention is described below with reference to the following Examples, which are not intended to limit the scope of the present invention in any way.

EXAMPLES

Example 1

Preparation of Fischer-Tropsch Derived Paraffin Wax Fractions with Congealing Points 30, 50, 70, 80 and 100° C.

Five Fischer-Tropsch derived paraffin wax fractions (Paraffin wax 1, Paraffin wax 2, Paraffin wax 3, Paraffin wax 4 and Paraffin wax 5) were obtained using a Fischer-Tropsch process. To this end, a Fischer-Tropsch effluent was prepared according to the method described in U.S. Pat. No. 6,858, 127. Based on C1+ hydrocarbons the effluent had a C30+ content of 25.8% m and a C60+ content of 8.5% m.

The effluent was separated in a fraction A which is in the gas phase at ambient conditions and a fraction B which is in the liquid or solid phase at ambient conditions.

Fraction B was hydrogenated over a nickel catalyst as described in WO 2007/082589 (Catalyst G). Process conditions were: a weight hourly space velocity (WHSV) of 1.0 kg/l/h, 30 bar of pure hydrogen at reactor inlet, a hydrogen over feedstock ratio of 1000 Nl/kg and a temperature of 220° C. The hydrogenated product was separated in a fraction C which is in the gas phase at ambient conditions and a fraction D which is in the liquid or solid phase at ambient conditions.

For all distillations described below care was taken to avoid temperatures above 370° C. for any part of the distillation equipment in contact with hydrocarbons and to avoid contact of hydrocarbons with oxygen. All distillations described below were carried out in a continuous mode.

Fraction D was subjected to a distillation at atmospheric pressure yielding a top stream comprising a fraction containing molecules with 9 or less carbon atoms, a side cut E containing molecules with 10 to 17 carbons atoms and a bottom stream F containing molecules with 18 to 300 carbon atoms. Fraction E consists of hydrogenated normal paraffins in the range C10-C17. Fraction F consists of hydrogenated normal paraffins in the C18 to C300 range. The effective cutpoint for the separation between streams E and F was 310° C.

Fraction F is subjected to a vacuum distillation. Besides a top product (stream G), a side cut (stream H) and a heavier side cut (stream J) were obtained as well as a bottom product (stream K). The distillation was run at a bottom temperature of 320° C. and a pressure of 15 mbar. The effective cutpoint between stream G and stream H was 340° C. The effective cutpoint between stream H and stream J was 450° C. The effective cutpoint between stream J and bottom stream K was 495° C. Stream G is obtained as a refined wax with a congealing point of about 30° C. (product 1=Paraffin 1). The yield of fraction J was 3.1% m on the Fischer-Tropsch effluent on a hydrocarbon basis. Stream H is obtained as a refined wax with a congealing point of about 50° C. (product 2=Paraffin 2). The yield of fraction H was 14.1% m on the Fischer-Tropsch effluent on a hydrocarbon basis. Stream J is obtained as a wax with a congealing point of about 70° C. Stream J is subjected to a hydrofinishing operation over a nickel catalyst as described in WO 2007/082589 (Catalyst G). Process conditions were: a weight hourly space velocity (WHSV) of 1.0 kg/l/h, 60 bar of pure hydrogen at reactor inlet, a hydrogen over feedstock ratio of 1000 Nl/kg and a temperature of 240° C. The product was separated in a fraction L which is in the gas phase at ambient conditions and a fraction M which is in the solid phase at ambient conditions. Stream M is obtained as a refined wax with a congealing point of about 70° C. The yield of stream M was 5.4% m of the Fischer-Tropsch effluent on a hydrocarbon basis.

Fraction M is obtained as a refined wax with a congealing point of about 70° C. (product 3=Paraffin wax 3).

The residue of this vacuum distillation (fraction K) is subjected to a short path distillation with an effective cut point of 520° C. The distillation was run at 0.2 mbar and 260° C. The distillate of the short path distillation (fraction N) is subjected to a hydrofinishing operation over a nickel catalyst as described in WO 2007/082589 (Catalyst G). Process conditions were: a weight hourly space velocity (WHSV) of 1.0 kg/l/h, 60 bar of pure hydrogen at reactor inlet, a hydrogen over feedstock ratio of 1000 Nl/kg and a temperature of 240° C. The product was separated in a fraction P which is in the gas phase at ambient conditions and a fraction Q which is in the solid phase at ambient conditions. Fraction Q is obtained as a refined wax with a congealing point of about 80° C. (product 4=Paraffin wax 4).

The yield of fraction Q was 3.1% m of the Fischer-Tropsch effluent on a hydrocarbon basis.

The residue of the short path distillation (fraction R) is subjected to a hydrofinishing operation over a nickel catalyst as described in WO 2007/082589 (Catalyst G). Process conditions were: a weight hourly space velocity (WHSV) of 1.0 kg/l/h, 60 bar of pure hydrogen at reactor inlet, a hydrogen over feedstock ratio of 1000 Nl/kg and a temperature of 240° C.

The product was separated in a fraction S which is in the gas phase at ambient conditions and a fraction T which is in the solid phase at ambient conditions. The yield of fraction T was 16.8% m of the Fischer-Tropsch effluent on a hydrocarbon basis. Fraction T is obtained as a refined wax with a congealing point of about 100° C. (product 5=Paraffin wax 5).

TABLE 1

| | Refined wax product | | | | |
|---|---|---|---|---|---|
| | Paraffin wax 1 | Paraffin wax 2 | Paraffin wax 3 | Paraffin wax 4 | Paraffin wax 5 |
| Congealing point, ° C. According to ASTM D938 | 31.9 | 50.7 | 71.4 | 79.5 | 101.9 |
| Oil content, % w According to ASTM D721 | N.A. | 1.6 | 0.42 | 0.37 | 0.27 |
| Saybolt colour[a], cm According to ASTM D156 | 30+ | 30+ | 30+ | 30+ | 30+ |
| Cloud point, ° C. According to ASTM D5773 | 36 | 56 | 77 | 87 | N.A. |

[a]The Saybolt colour scale is used to quantify colour intensity for mildly coloured substances in liquid state. For this objective waxes are molten for measurement. The scale runs from <−16 cm to >30 cm. >30 cm means water white. The higher the number the better (i.e. the lesser) the colour.

Example 2

Preparation of Fischer-Tropsch Derived Paraffin Wax Fractions with Congealing Points 30, 50, 70, 80 and 105° C.

Five Fischer-Tropsch derived paraffin wax fractions (Paraffin wax 1, Paraffin wax 2, Paraffin wax 3, Paraffin wax 4 and Paraffin wax 5) were obtained using a Fischer-Tropsch process. To this end, a Fischer-Tropsch effluent was prepared according to the method described in U.S. Pat. No. 6,858,127. Based on C1+ hydrocarbons the effluent had a C30+ content of 49.51% m and a C60+ content of 26.36% m.

The effluent was separated in a fraction A which is in the gas phase at ambient conditions and a fraction B which is in the liquid or solid phase at ambient conditions.

Fraction B was hydrogenated over a nickel catalyst as described in WO 2007/082589 (Catalyst G). Process conditions were: a weight hourly space velocity (WHSV) of 1.0 kg/l/h, 30 bar of pure hydrogen at reactor inlet, a hydrogen over feedstock ratio of 1000 Nl/kg and a temperature of 220° C. The hydrogenated product was separated in a fraction C which is in the gas phase at ambient conditions and a fraction D which is in the liquid or solid phase at ambient conditions.

For all distillations described below care was taken to avoid temperatures above 370° C. for any part of the distillation equipment in contact with hydrocarbons and to avoid contact of hydrocarbons with oxygen. All distillations described below were carried out in a continuous mode.

Fraction D was subjected to a distillation at atmospheric pressure yielding a top stream comprising a fraction containing molecules with 9 or less carbon atoms, a side cut E containing molecules with 10 to 17 carbons atoms and a bottom stream F containing molecules with 18 to 300 carbon atoms. Fraction E consists of hydrogenated normal paraffins in the range C10-C17. Fraction F consists of hydrogenated normal paraffins in the C18 to C300 range. The effective cutpoint for the separation between streams E and F was 310° C.

Fraction F is subjected to a vacuum distillation. Besides a top product (stream G), a side cut (stream H) and a heavier side cut (stream J) were obtained as well as a bottom product (stream K). The distillation was run at a bottom temperature of 340° C. and a pressure of 20 mbar. The effective cutpoint between stream G and stream H was 350° C. The effective cutpoint between stream H and stream J was 440° C. The effective cutpoint between stream J and bottom stream K was 495° C. Stream G is obtained as a refined wax with a congealing point of about 30° C. (product 1=Paraffin 1). The yield of fraction J was 4.2% m on the Fischer-Tropsch effluent on a hydrocarbon basis. Stream H is obtained as a refined wax with a congealing point of about 50° C. (product 2=Paraffin 2). The yield of fraction H was 11.8% m on the Fischer-Tropsch effluent on a hydrocarbon basis. Stream J is obtained as a wax with a congealing point of about 70° C. Stream J is subjected to a hydrofinishing operation over a nickel catalyst as described in WO 2007/082589 (Catalyst G). Process conditions were: a weight hourly space velocity (WHSV) of 1.0 kg/l/h, 60 bar of pure hydrogen at reactor inlet, a hydrogen over feedstock ratio of 1000 Nl/kg and a temperature of 240° C. The product was separated in a fraction L which is in the gas phase at ambient conditions and a fraction M which is in the solid phase at ambient conditions. Stream M is obtained as a refined wax with a congealing point of about 70° C. The yield of stream M was 4.0% m of the Fischer-Tropsch effluent on a hydrocarbon basis.

Fraction M is obtained as a refined wax with a congealing point of about 70° C. (product 3=Paraffin wax 3).

The residue of this vacuum distillation (fraction K) is subjected to a short path distillation with an effective cut point of 520° C. The distillation was run at 0.2 mbar and 260° C. The distillate of the short path distillation (fraction N) is subjected to a hydrofinishing operation over a nickel catalyst as described in WO 2007/082589 (Catalyst G). Process conditions were: a weight hourly space velocity (WHSV) of 1.0 kg/l/h, 60 bar of pure hydrogen at reactor inlet, a hydrogen over feedstock ratio of 1000 Nl/kg and a temperature of 240° C. The product was separated in a fraction P which is in the gas phase at ambient conditions and a fraction Q which is in the solid phase at ambient conditions. Fraction Q is obtained as a refined wax with a congealing point of about 80° C. (product 4=Paraffin wax 4).

The yield of fraction Q was 4.0% m of the Fischer-Tropsch effluent on a hydrocarbon basis.

The residue of the short path distillation (fraction R) is subjected to a hydrofinishing operation over a nickel catalyst as described in WO 2007/082589 (Catalyst G). Process conditions were: a weight hourly space velocity (WHSV) of 1.0 kg/l/h, 60 bar of pure hydrogen at reactor inlet, a hydrogen over feedstock ratio of 1000 Nl/kg and a temperature of 240° C.

The product was separated in a fraction S which is in the gas phase at ambient conditions and a fraction T which is in the solid phase at ambient conditions. The yield of fraction T was 34.7% m of the Fischer-Tropsch effluent on a hydrocarbon basis. Fraction T is obtained as a refined wax with a congealing point of about 100° C. (product 5=Paraffin wax 5).

TABLE 2

| | Refined wax product | | | | |
|---|---|---|---|---|---|
| | Paraffin wax 1 | Paraffin wax 2 | Paraffin wax 3 | Paraffin wax 4 | Paraffin wax 5 |
| Congealing point, ° C. According to ASTM D938 | 32.9 | 51.1 | 70.5 | 79.6 | 107.2 |
| Oil content, % w According to ASTM D721 | N.A. | 1.5 | 0.43 | 0.36 | 0.22 |
| Saybolt colour$^a$, cm According to ASTM D156 | 30+ | 30+ | 30+ | 30+ | 30+ |
| Cloud point, ° C. According to ASTM D5773 | 38 | 57 | 77 | 86 | N.A. |

Discussion

The results in Table 1 show that starting from one hydrogenated Fischer-Tropsch effluent having C30+ content of 25.8% m and a C60+ content of 8.5% m five wax products having a congealing point of about 30° C., 50° C., 70° C., 80° C. and 100° C. were obtained. Furthermore, all five wax products, thus also including the wax product with the high congealing point of about 100° C. have a high Saybolt colour and four have a low oil content.

Similar results were obtained with the hydrogenated Fischer-Tropsch effluent having a C30+ content of 49.5% m and a C60+ content of 26.4% m, with the only difference that with this effluent a wax with a congealing point of about 105° C. was obtained. Surprisingly, the results in Table 2 show that even the wax with such a high congealing point has a high Saybolt colour and a low oil content.

These observations indicate that the obtained refined waxes can be advantageously used in applications such as candles, crayons, packaging, PVC lubricant, hot melt adhesives, and inks.

That which is claimed is:

1. A process to prepare paraffins and waxes, the process at least comprising the following steps:
    (a) providing a Fischer-Tropsch product stream comprising paraffins having from 10 to 300 carbon atoms;
    (b) subjecting the Fischer-Tropsch product stream of step (a) to a hydrogenation step, thereby obtaining a hydrogenated Fischer-Tropsch product stream comprising 10 to 300 carbon atoms;
    (c) separating the hydrogenated Fischer-Tropsch product stream of step (b), thereby obtaining at least a fraction comprising 10 to 17 carbon atoms and a fraction comprising 18 to 300 carbon atoms;
    (d) separating the fraction comprising 18 to 300 carbon atoms of step (c), thereby obtaining one or more first light waxes having a congealing point in the range of 30 to 75° C. and a second heavy wax having a congealing point in the range of 75 to 120° C.;
    (e) hydrofinishing one or more wax fractions having a congealing point in the range of 30 to 75° C. of step (d) thereby obtaining one or more hydrofinished wax fractions having a congealing point in the range of 30 to 75° C.

2. A process according to claim 1, wherein the fraction comprising 18 to 300 carbon atoms of step (b), is separated in step (c) by vacuum distillation at a pressure between 5 and 20 mbar.

3. A process according to claim 1, wherein the one or more first light waxes are obtained as distillate and/or side cuts in vacuum distillation.

4. A process according to claim 3, wherein the one or more first light waxes are a first light wax fraction having a congealing point in the range of from 30 to 35° C., a second light wax fraction having a congealing point in the range of from 50 to 60° C. and a third light wax having a congealing point in the range of from 65 to 75° C.

5. A process according to claim 1, wherein the second heavy wax of step (d) is separated, thereby obtaining at least one distillate wax fraction having a congealing point in the range of between 75 to 85° C. and at least one residual wax fraction having a congealing point in the range of from 95 to 120° C.

6. A process according to claim 5, wherein the distillate wax fraction having a congealing point in the range of between 75 to 85° C. is hydrofinished to obtain a hydrofinished heavy distillate wax fraction having a congealing point in the range of between 75 and 85° C.

7. A process according to claim 5, wherein the residual wax fraction having a congealing point in the range of 95 to 120° C. is hydrofinished to obtain a hydrofinished heavy residual wax fraction having a congealing point in the range of 95 to 120° C.

8. A process according to claim 5, wherein the second heavy wax of step (d) is separated by short path distillation at a pressure between 0.05 and 0.5 mbar.

9. A process according to claim 5, wherein the second heavy wax of step (d) is separated by short path distillation at a pressure between 0.05 and 0.3 mbar.

10. A process according to claim 1, wherein a part of the second heavy wax of step (d) is subjected to a hydrocracking/hydroisomerisation step to obtain a partly isomerised product.

11. A Fischer-Tropsch derived wax that has been obtained according to claim 1 having an oil content according to ASTM D721 of from 0.22 wt. % to 0.5 wt. %, wherein the Fischer-Tropsch derived wax has a congealing point in the range of 75 to 120° C.

12. A Fischer-Tropsch derived wax according to claim 11, having a Saybolt colour of more than 25 cm, wherein the Fischer-Tropsch derived wax has a congealing point in the range of 75 to 120° C.

13. A process according to claim 1, wherein the fraction comprising 18 to 300 carbon atoms of step (b), is separated in step (c) by vacuum distillation at a pressure between 5 and 15 mbar.

14. A process according to claim 1, wherein the fraction comprising 18 to 300 carbon atoms of step (b), is separated in step (c) by vacuum distillation at a pressure between 10 and 15 mbar.

15. A process according to claim 1, wherein the hydrofinished wax fraction has a Saybolt colour according to ASTM D156 of more than 25 cm.

16. A process according to claim 1, wherein the hydrofinished wax fraction has a Saybolt colour according to ASTM D156 of more than 28 cm.

17. A Fischer-Tropsch derived wax that has been obtained according to claim 1 having an oil content according to ASTM D721 of from 0.22 wt. % to 0.5 wt. %, wherein the Fischer-Tropsch derived wax has a congealing point in the range of 95 to 120° C.

18. A Fischer-Tropsch derived wax according to claim 17, having a Saybolt colour of more than 25 cm, wherein the Fischer-Tropsch derived wax has a congealing point in the range of 95 to 120° C.

* * * * *